United States Patent
Eves et al.

(10) Patent No.: US 6,710,787 B1
(45) Date of Patent: Mar. 23, 2004

(54) WEB BROWSER GRAPHICS MANAGEMENT

(75) Inventors: David A. Eves, Crawley (GB); Allan R. Timms, Peacehaven (GB)

(73) Assignee: Koninklijke Philips Electronics N.V., Eindhoven (DE)

( * ) Notice: Subject to any disclaimer, the term of this patent is extended or adjusted under 35 U.S.C. 154(b) by 0 days.

(21) Appl. No.: 09/401,930

(22) Filed: Sep. 23, 1999

(30) Foreign Application Priority Data

Sep. 28, 1998 (GB) ............................................. 9820993

(51) Int. Cl.⁷ ................................................. G09G 5/00
(52) U.S. Cl. ....................... 345/764; 345/744; 345/783; 709/218; 709/229; 709/232
(58) Field of Search ................................ 345/716, 723, 345/744, 700, 841, 783, 530, 539, 764; 348/10, 12, 13, 17, 461, 906; 395/200.33, 200.35; 709/218, 229, 232

(56) References Cited

U.S. PATENT DOCUMENTS

| | | | | |
|---|---|---|---|---|
| 5,844,620 A | * | 12/1998 | Coleman et al. | 725/54 |
| 5,958,016 A | * | 9/1999 | Chang et al. | 709/229 |
| 6,018,768 A | * | 1/2000 | Ullman et al. | 709/218 |
| 6,072,483 A | * | 6/2000 | Rosin et al. | 345/716 |
| 6,173,330 B1 | * | 1/2001 | Guo et al. | 709/232 |

OTHER PUBLICATIONS

Webb M.: "Re: Pre-loading of html pages"Deja News, Online! Apr. 18 1998, XP002129130.
Mannos T.J: "Web page prefetching?" Deja News, Online! Dec. 01, 1997 XP00209577.

* cited by examiner

*Primary Examiner*—Raymond J. Bayerl
*Assistant Examiner*—Cuong T. Thai
(74) *Attorney, Agent, or Firm*—Peter Zawilski

(57) ABSTRACT

A network communications system comprises a plurality of user stations (16, 18, 20, 22, 24), each with respective processing and display capability. At least some of the stations are provided with a predictor mechanism which determines, for a given downloaded data page, the most likely next page, calls that data page up over the network, and downloads it to local cache storage whilst the user is still viewing the first page. To reduce some of the worst delays, due to graphic image downloads, one or more service provider host systems coupled via a data network such as the Internet packages all the graphics data for a particular group of pages into a single dummy page which the user systems then background-download to cache.

7 Claims, 2 Drawing Sheets

WEB BROWSER GRAPHICS MANAGEMENT

BACKGROUND OF THE INVENTION

The present invention relates to a method for the handling of graphics in the provision of an Internet or other network-based service to an end-user, in particular to an end-user of consumer electronics equipment, and to apparatus configured to support the method.

As is well recognised, there is a continued rapid growth in Internet usage, and accompanying this there is an increase in the number of consumer electronics devices other than personal computers (PC's) featuring connectivity to the World Wide Web. Web-TV of Philips Magnavox is an example of a device that provides the user with an exciting synergy between the conventional TV on the one hand and the Internet on the other. The Philips Magnavox WebTV Plus Receiver offers a WebPIP (picture in picture) feature. Users can watch a television program simultaneously while maintaining a connection to the Web, even if their television set does not have PIP capability. This enables, for example, watching a TV show and being able to retrieve your E-mail at the same time without ever having to leave the living room couch.

Although the enhanced functionality of devices such as the Web TV provides added value to the consumer, it will be recognised that the devices do not in general have the same data processing capabilities nor data supply bandwidth as, for example, that of a powerful PC, and some applications can greatly slow the operation of the device. Caching of data when browsing the Web is one known technique used in order to reduce delays during navigation. It works by the short-term storage of data that has already been downloaded, commonly until the available storage is getting full. Then, if the user revisits a page or another page that reuses the same data, it can be presented almost immediately. This provides a saving in both time and bandwidth. In an Internet application, the downloading of graphics data (herein used to refer to all visible assets on an Internet page other than HTML text) can be a serious cause of delays, with the contrast in speed when these assets can be loaded from cache as against downloading via the network highlighting the need for improved efficiency in the delivery process.

SUMMARY OF THE INVENTION

It is accordingly an object of the present invention to provide a means whereby delays in presentation of graphics to a user are reduced, without requiring excessive data transmission bandwidth.

In accordance with the present invention there is provided a network communications system comprising a plurality of user stations and a plurality of service provider host systems coupled via a data network, wherein each user station comprises respective processing and display means configured to access, process and display pages of data from a selected one of said host provider systems, including storage means into which a data page may be downloaded via the network whilst display of data from another page is underway, characterised in that one or more of said service provider host systems provides all graphics attributes of a predetermined collection of pages within a single dummy page, with a user station configured to download said dummy page to said storage means whilst display of data from a first of said collection of pages takes place. By downloading all the graphics assets for a group of pages in one single page, whilst another page is being presented to the user, the perceived improvement in loading times for subsequent graphics to the user is noticeable, since these assets have already been loaded to the local page memory or cache.

In such a network communications system, a service provider host system may include in the said first page of a predetermined collection the network storage address from which the respective dummy page may be accessed by the user station. Also, the service provider host systems may suitably determine a most likely order for user requirement of the dummy page graphics assets and arrange them accordingly with the assets most likely to be required being downloaded at the head of the dummy page: with this arrangement, even if the background downloading of the dummy page is still ongoing, there is an improved chance that the required assets will already have been downloaded to storage. Alternatively, the service provider host systems may arrange the dummy page graphics assets in order of size, with the largest being downloaded at the head of the dummy page.

Also in accordance with the present invention there is provided a data network browser configured as a user station for use in the network communications system described above, said browser comprising a data processor coupled with a network interface, data page store, and an output for driving a display, the browser being arranged to check data accompanying a received page for display to identify whether a network address for the said dummy page is present and, if so, to load the said dummy page via the network into the said data page store. In such a browser, the data processor may be configured to check always for the presence of required graphics assets in the said data page store prior to calling for them via the network.

Further in accordance with the present invention there is provided a network server for use as the said first service provider host system in a network communications system as recited above, the server comprising a first storage means maintaining a plurality of pages of data accessible by remote user, further storage means holding as a single dummy data page all the graphics assets required in display of the said plurality of pages of data, the server being configured to include in the first of the said plurality of pages of data downloaded to a user an access address for the said dummy page

BRIEF DESCRIPTION OF THE DRAWINGS

Further features and advantages of the present invention will become apparent from reading of the following description of preferred embodiments of the present invention, given by way of example only and with reference to the accompanying drawings in which.

DESCRIPTION OF THE PREFERRED EMBODIMENTS

Figure 1:
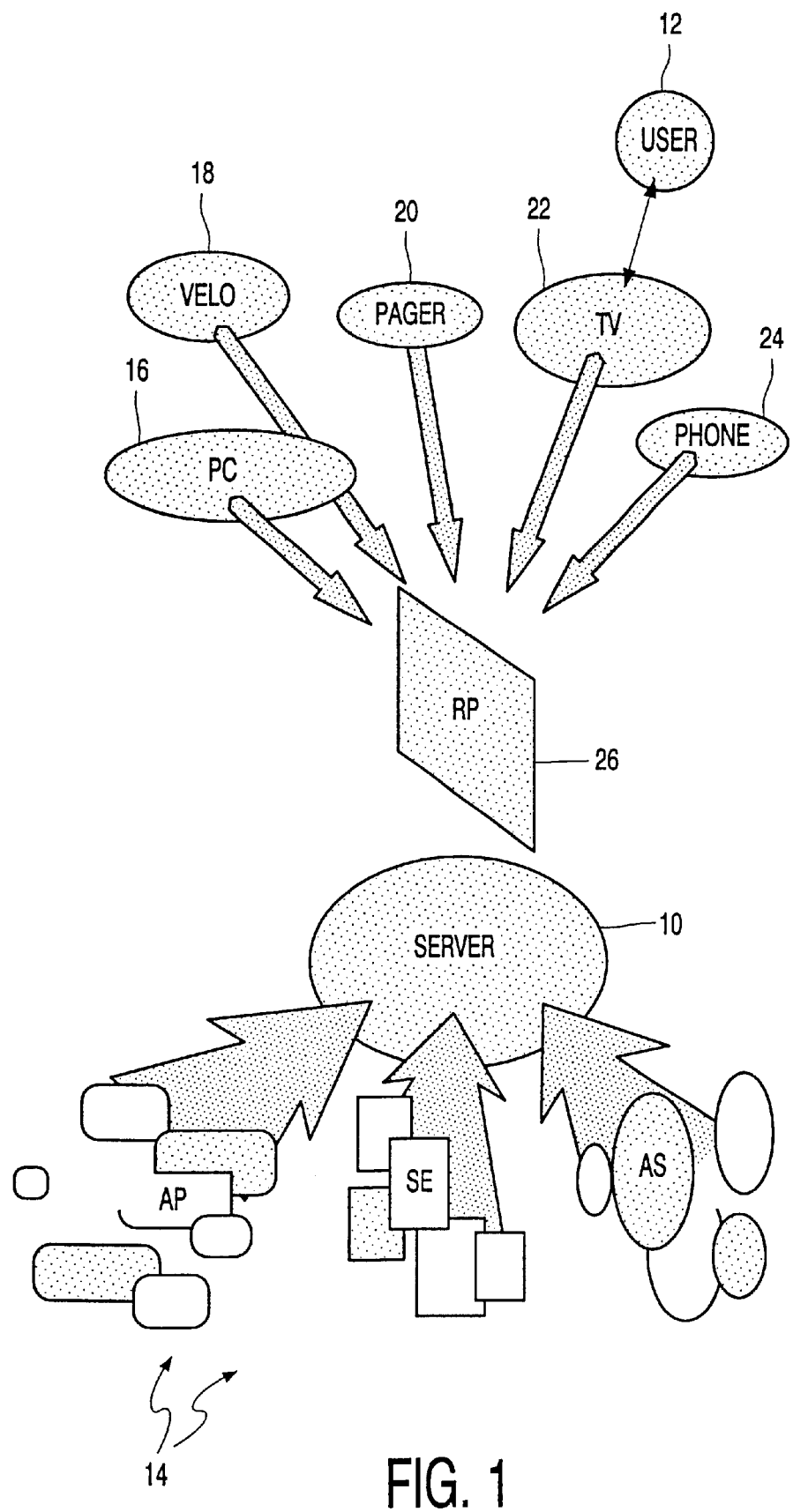
FIG. 1 is a general schematic diagram of user devices enabled to access a plurality of remote services and applications via a server.

Beginning with FIG. 1, in the generalised system shown, a server 10 acts as arbiter between users 12 and content from a variety of sources, indicated generally at 14. As shown, the user access may be by means of any one of a number of devices (clients) in his/her possession, such as a personal computer (PC) 16, electronic personal organiser (VELO) 18, pager 20, television 22 (the selected means in the illustrated example), or telephone 24. To handle, for the user, the large number of potential interface arrangements between types of user access device and accessed applications AP, assets AS or services SE, the server 10 stores a representation RP (shown generally at 26) of both the user and the clients that they use. This stored representation forms the basis for a bidirectional translation utility to support uniformity in interfacing for a user, as is described in greater detail in the commonly assigned pending UK patent application no. 9815364.6 filed Jul. 16, 1998 and entitled "Data Network Interfacing".

In operation, each of the access devices 16, 18, 20, 22, 24 effectively comprises respective processing and display means configured to access, process and display pages of data from a selected one of the sources 14. For operation according to the present invention, one or more of the accessing devices, such as TV 22 is configured with a utility for pre-loading pages of data from the selected remote source, that is to say calling up pages and storing them rather than displaying them to the user on arrival. The above-mentioned WebTV has this feature and uses it in combination with a predictor module to select pages to be downloaded, such that there is an improvement in the overall performance whenever the predictor has been correct and the user calls for a page which is already locally cached. The particular value of this feature, recognised by the present applicants, is that the particularly data-heavy area of graphics in data pages may be relieved to some extent by making use of this background pre-loading mechanism in combination with the particular arrangement of having, for a given group of pages to be downloaded, all the graphics for those pages together on a single dummy page which may be background downloaded to local storage in the users access device, without disturbing their viewing of the initial pages.

Within the dummy page, not only are all the graphics for the particular web site (or collection of pages) included, the various items of content are also ordered with the largest (and/or most likely to be required first) graphics assets toward the head of the dummy page such that they arrive first at the user machine. Once this background pre-loading has started, it continues as the user navigates the site and, with careful planning of the web site and dummy page layout, the required graphics will be highly likely to have been downloaded before they are required, even if the whole of the dummy page has yet to be received.

No user will visit the dummy page: it is used purely as a list of the graphics assets required by the web site, which assets will generally all have been pre-loaded to local cache or page storage memory.

Figure 2:
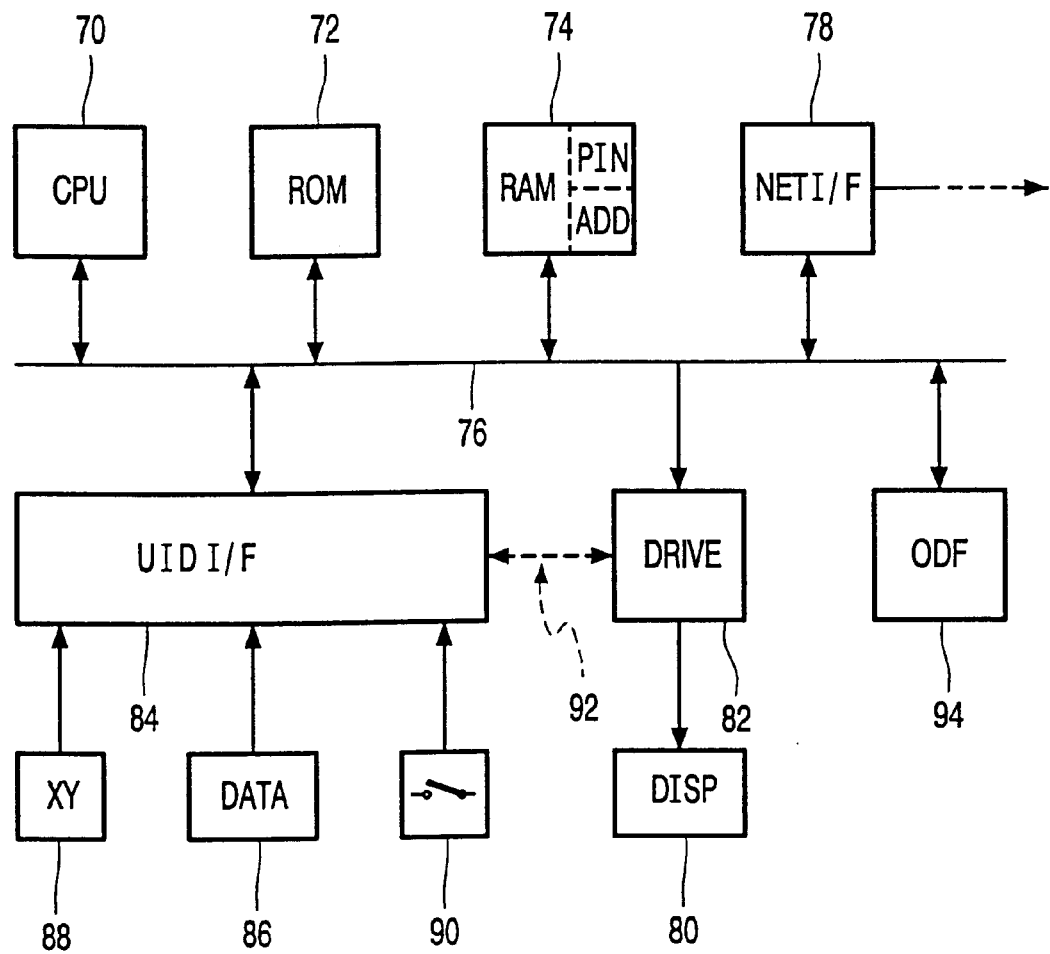
FIG. 2 represents functional features of a client device suitable to embody the present invention.

Typical functional features of a client device configured as a network browser for use with the generic server 10 described in relation to FIG. 1 above are illustrated in FIG. 2. Basically, these comprise a central processing unit CPU 70, read only memory ROM 72, random access memory RAM 74, all coupled via an address and data bus 76.

Also coupled to the bus is a network interface stage 78, with the random access memory RAM 74 holding for example a users PIN (to enable network access) and network address ADD for the host server, as well as optionally acting as a cache or page store for the background downloaded graphics assets. ROM 72 holds the local end of one or more shared applications including, for example, capabilities for downloading of software from the server 10. As will be appreciated, the network interface 78 may take a number of forms depending on the form of the client device and the users means for connection to the server: for example, where the client is a PC, the network interface may comprise a built-in modem or ISDN link, whereas if the client is a pager or telephone, the network interface will include a (preferably) cordless connection to a local link to the server. A display device 80 is also coupled to the bus, via display driver 82 circuit. Again, the particular form of display will be to a certain extent determined by the client device, with a PC possibly having a cathode ray screen and other client devices using liquid crystal displays.

A user input device UID interface 84 handles input whatever form of control means are provided by the client. These will typically include a data input 86, for example an alphanumeric keyboard in a personal computer, or personal digital assistant keyboard, keypad for a telephone, or control buttons for a pager; also typically, input for some client types will be a positional signal from an XY pointer device 88 such as a mouse or joystick or input as part of a touch screen mapping system. For all client types, there is also a single input 90 for a simplified connection routing, as described in the above-referenced UK patent application no.9815364.6. These inputs 86, 88, 90 may be physical keys, switches or buttons or, as indicated by dashed line 92, some or all of these may be selectable icons or buttons appearing on display 80 with operation through cursor selection or by means of touch screen technology.

As shown at 94, other device functions ODF are also coupled to the address and data bus 76: these other functions will be specific to the operation of the client device but will not have (necessarily) any effect on its interaction with the server, and hence will not be further described.

In the foregoing we have described a network communications system comprising a plurality of user stations, each with respective processing and display capability. At least some of the stations are provided with a predictor mechanism which determines, for a given downloaded data page, the most likely next page, calls that data page up over the network, and downloads it to local cache storage whilst the user is still viewing the first page. To reduce some of the worst delays, due to graphic image downloads, one or more service provider host systems coupled via a data network such as the Internet packages all the graphics data for a particular group of pages into a single dummy page which the user systems then background-download to cache.

From reading the present disclosure, other modifications will be apparent to persons skilled in the art. Such modifications, whilst remaining within the scope of the following claims, may involve other features which are already known in the design, manufacture and use of data transmission and presentation systems, display apparatuses and component parts thereof and which may be used instead of or in addition to features already described herein.

What is claimed is:

1. A network communications system comprising a plurality of user stations and a plurality of service provider host systems coupled via a data network, wherein each user station comprises respective processing and display means configured to access, process and display pages of data from selected one of said host provider systems, including storage means into which a data page may be downloaded via the network whilst display of data from another page is underway, wherein one or more of said service host systems provides all graphics attributes of a predetermined collection of pages within a single dummy page, with a user station configured to download said dummy page to said storage means whilst display of data from a first of said collection of pages takes place and wherein the data network comprises a bi-directional network.

2. A network communications system as claimed in claim 1, wherein a service provider host system includes in said first page of a predetermined collection the network storage address from which the respective dummy page may be accessed by said user station.

3. A network communications system as claimed in claim 1, wherein the service provider host systems determine a most likely order for user requirement of the dummy page graphics assets and arrange them accordingly with the assets most likely to be required being downloaded at the head of the dummy page.

4. A network communications system as claimed in claim 1, wherein the service provider host systems arrange the dummy page graphics assets in order of size, with the largest being downloaded at the head of the dummy page.

5. A browser as claimed in claim 4, with said data processor being configured to check always for the presence of required graphics assets in said data page store prior to calling for them via the network.

6. A data network browser configured as a user station for use in the network communications system of claim 1, said browser comprising a data processor coupled with a network interface, data page store, and an output for driving a display, the browser being arranged to check data accompanying a received page for display to identify whether a network address for said dummy page is present and, if so, to load said dummy page via the network into said data page store.

7. A network server for use as said first service provider host system in a network communications system as claimed in claim 1, the server comprising a first storage means maintaining a plurality of pages of data accessible by remote user, further storage means holding as a single dummy data page all the graphics assets required in display of said plurality of pages of data, said server being configured to include in the first of said plurality of pages of data downloaded to a user an access address for said dummy page.

* * * * *